United States Patent [19]

Margolis

[11] Patent Number: 4,723,512
[45] Date of Patent: Feb. 9, 1988

[54] ANIMAL HABITAT

[75] Inventor: Jerry Margolis, Irvington, N.J.

[73] Assignee: Metaframe, Inc., N.J.

[21] Appl. No.: 791,571

[22] Filed: Oct. 25, 1985

[51] Int. Cl.$^4$ .............................................. A01K 1/00
[52] U.S. Cl. ........................................................ 119/15
[58] Field of Search ............ 119/1, 15, 17, 18, 19, 119/29; 220/4 C, 5 C

[56] References Cited

U.S. PATENT DOCUMENTS

| | | | |
|---|---|---|---|
| 1,116,919 | 11/1914 | Rahn | 6/4 R X |
| 3,774,576 | 11/1973 | Moore | 119/17 |
| 3,791,346 | 2/1974 | Willinger et al. | 119/15 |
| 3,859,961 | 1/1975 | Willinger et al. | 119/15 |
| 3,958,534 | 5/1976 | Perkins et al. | 119/15 |
| 4,078,522 | 3/1978 | Akers | 119/5 |
| 4,086,876 | 5/1978 | Moore et al. | 119/5 |

FOREIGN PATENT DOCUMENTS

| | | | |
|---|---|---|---|
| 981502 | 5/1951 | France | 220/4 C |

Primary Examiner—Robert P. Swiatek
Assistant Examiner—David L. Tarnoff
Attorney, Agent, or Firm—Howard C. Miskin

[57] ABSTRACT

A modular animal habitat includes at least one vertical stack of similar compartment units formed of a transparent plastic, each unit including a rectangular bottom wall and front rear and end walls projecting upwardly from the bottom wall borders and terminating in coplanar flanges. Each unit rests on an underlying unit and has depending tongues engaging the inside faces of the underlying unit front and rear wall. The end walls of each unit have circular ports and an internally ribbed conduit network extends vertically along each end of the stack and is formed of tubular tees whose cross arms are coaxial and separably joined end to end and radial legs of alternate tees are coupled to the ports in successive units. Representations are applied to the unit walls by decacomania and the top unit is closed by a roof cover. Transversely offset habitat stacks may be coupled by the conduit network. Each tee is formed of mating halves separably interlocked by retainer rings.

12 Claims, 7 Drawing Figures

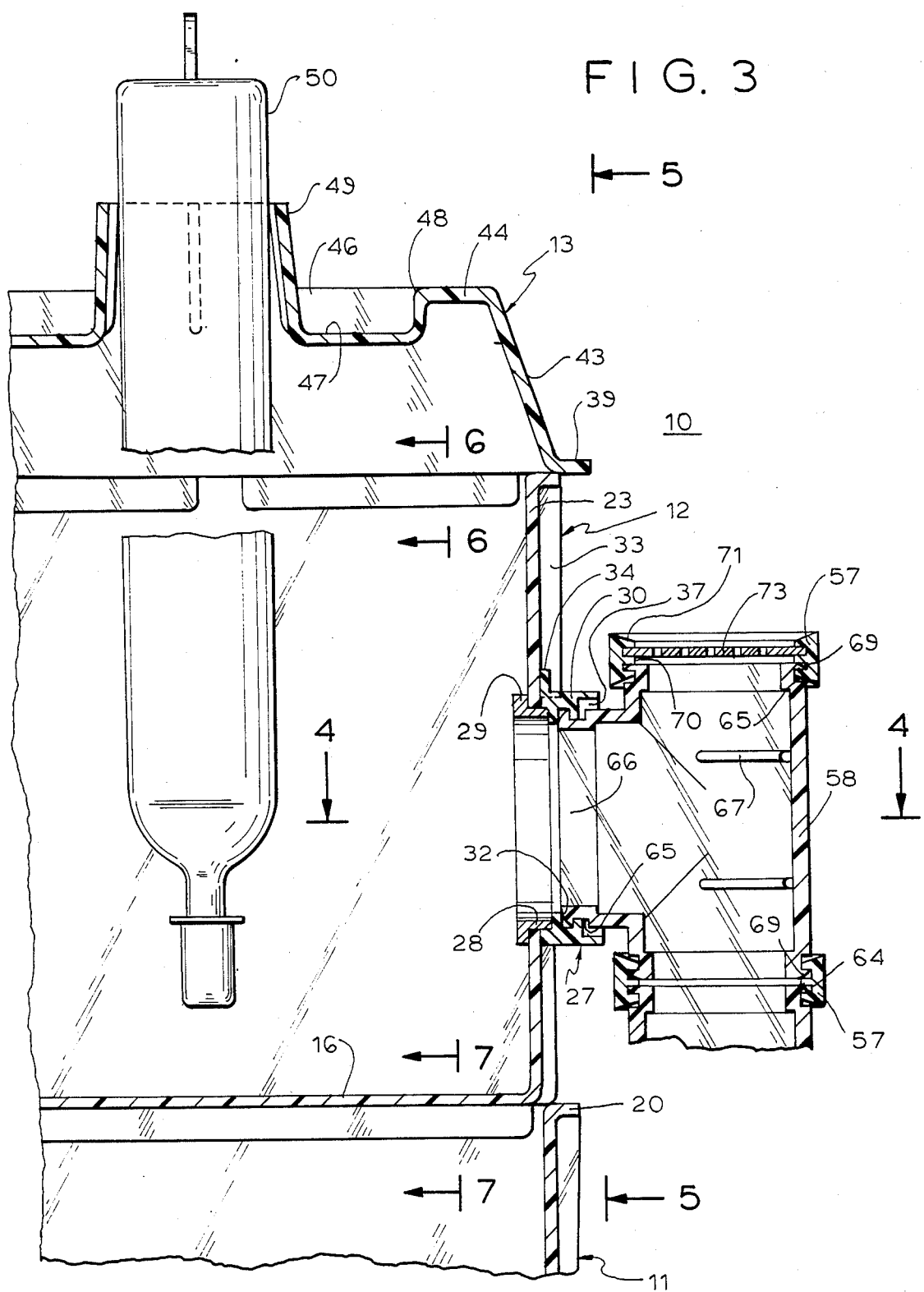

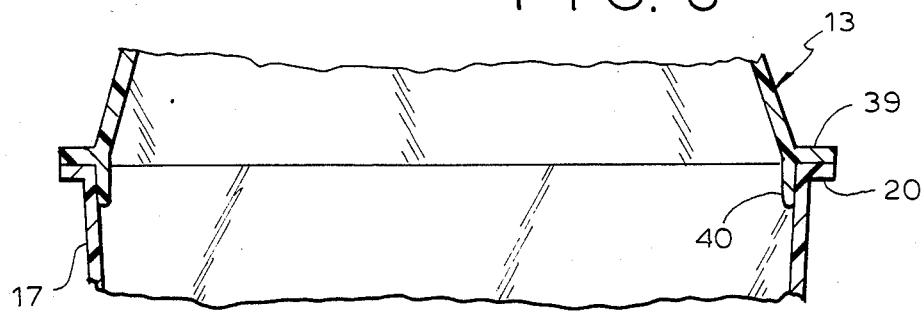
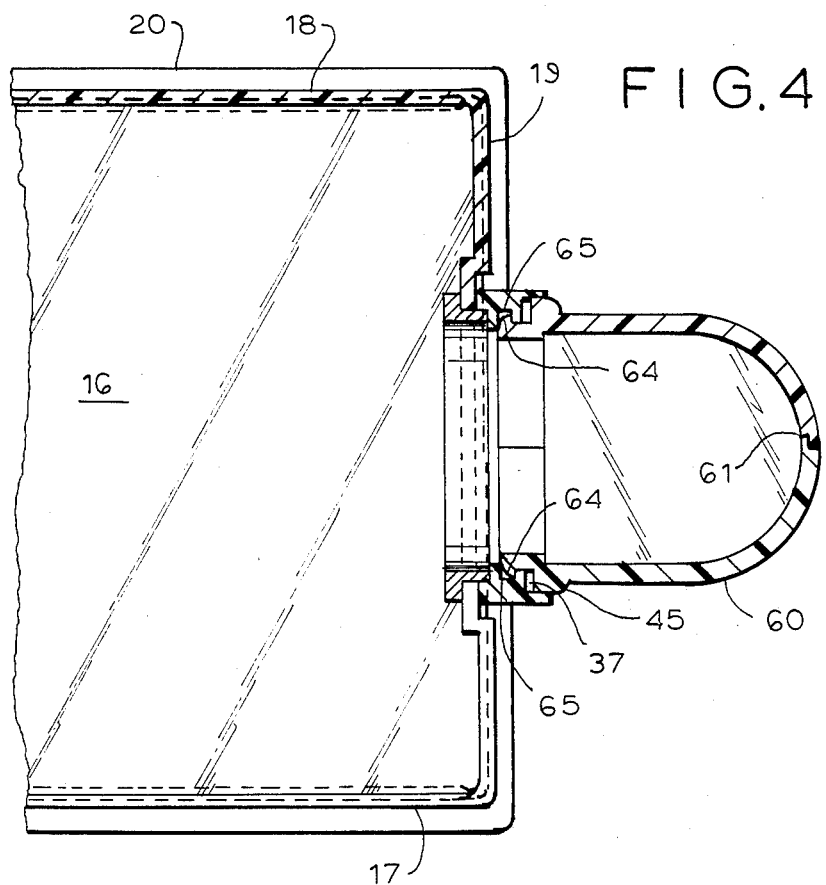
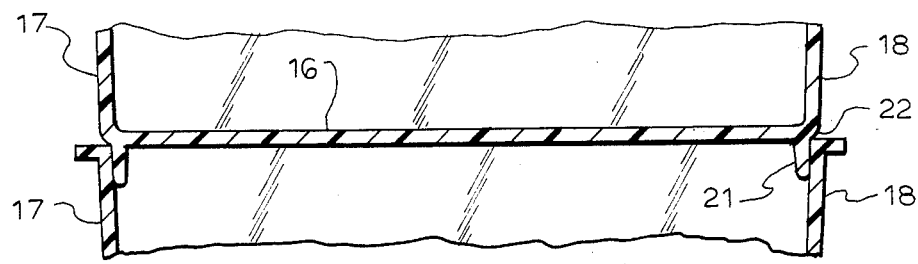

ANIMAL HABITAT

BACKGROUND OF THE INVENTION

The present invention relates generally to improvements in animal habitats and it relates more particularly to an improved modular housing for small mammals such as rodents and the like which includes a multiplicity of housing sections with intercommunicating passageways.

In the observation and study of the activities, antics and behavior of small animals such as rodents and the like for experimental or research purposes or as a hobby or amusement it has been a common practice to house the animal in a cage or other visually accessible enclosure. This practice leaves much to be desired since the close confinement of the animal greatly limits the range and amounts of its activity and otherwise introduces conditions not found in the animals natural habitat and not only reduces the animals activity but also effects its normal behavior. A passageway connected multiple housing animal habitat which overcomes many of the drawbacks of the conventional cage or housing is disclosed in U.S. Pat. No. 3,791,346 granted Feb. 12, 1974 to Willinger et al. and includes a plurality of subhousings interconnected by passageway defining tubes. While this animal habitat structure is highly satisfactory it possesses numerous drawbacks and disadvantages. Among these drawbacks and disadvantages are the high area requirements even in the case of a small number of enclosures, its awkwardness and inconvenience, its unattractive appearance and its low adaptability and versatility.

SUMMARY OF THE INVENTION

It is a principal object of the present invention to provide an improved animal habitat.

Another object of the present invention is to provide an improved multiple housing habitat for small animals such as rodents and the like.

Still another object of the present invention is to provide an improved multilevel animal habitat which occupies a minimum of area for the space available to the housed animal.

A further object of the present invention is to provide an improved habitat for small animals which includes a plurality of housings or compartments interconnected by animal passageway defining conduits.

Still a further object of the present invention is to provide a modular multicompartment animal habitat which may be easily and rapidly assembled in numerous arrangements and relationships and which may be selectively decorated as desired.

Another object of the present invention is to provide an animal habitat of the above nature characterized by its great versatility and adaptability, its attractive appearance and the great freedom and incentive afforded the housed animal for enhancing its activity and comfort.

The above and other objects of the present invention will become apparent from a reading of the following description taken in conjunction with the accompanying drawings which illustrate a preferred embodiment thereof.

An animal habitat in accordance with the present invention comprises a vertical stack of at least two similarly shaped module housing units the upper unit located atop and supported by the lower unit, each unit including a vertically extending peripheral wall and a horizontal partition defining wall located proximate one end of the peripheral wall, the unit being open at the opposite end and each peripheral wall having a similarly located port formed therein and a passageway defining conduit including upper and lower end sections engaging respective ports in said peripheral wall and an intermediate section extending between said end sections, said conduit providing communication between said upper and lower unit. The conduit, to great advantage, locks the upper and lower units in their vertically stacked condition.

In the preferred form of the improved animal habitat each of the housing units is integrally formed of a clear transparent thermoplastic composition and is open at its top, the partition wall being rectangular and at the bottom of the unit. The unit peripheral wall includes rectangular front and rear walls and rectangular end walls projecting upwardly from respective edges of the unit bottom wall. The peripheral walls terminate at their tops in outwardly projecting horizontal flanges and laterally extending lips depend from the bottom wall shortly inwardly from the bottom wall front and rear edges to delineate front and rear shoulders which rest on the flanges on the front and rear walls of the next successive lower housing unit, the lips engaging the upper borders of the inside faces of the front and rear walls of the lower unit and limit relative horizontal movement between the stacked units. The top opening in the top most housing unit is closed by a cover member having a peripheral flange resting on the top unit top flange and depending lips telescoping the top unit. A circular port is formed in each end wall of each housing unit and a coupling collar is mounted in each port. The conduit connecting two unit ports includes an intermediate T-section with its cross arm vertical side legs coupled to the vertical cross arm side legs of similar conduit T-sections whose horizontal middle legs are connected to the coupling collars of upper and lower housing units. The conduits function as animal passageways between the housing units and to lock the assembled units in their vertically stacked condition. Decalcomania of various patterns are provided for selective application to walls of the housing units to simulate desired structures and components.

The improved animal habitat is rugged and highly attractive, highly efficient in its use of available space, easy to rapidly assemble in any desired arrangement, houses the animal inhabitants under optimum conditions and is highly versatile and adaptable.

BRIEF DESCRIPTION OF THE DRAWINGS

FIG. 3 is a fragmental enlarged medial lateral sectional view of the upper part thereof;

FIG. 4 is a sectional view taken along line 4—4 in FIG. 3;

FIG. 6 is a sectional view taken along line 6—6 in FIG. 3; and

FIG. 7 is a sectional view taken along line 7—7 in FIG. 3.

DESCRIPTION OF THE PREFERRED EMBODIMENT

Figure 1:
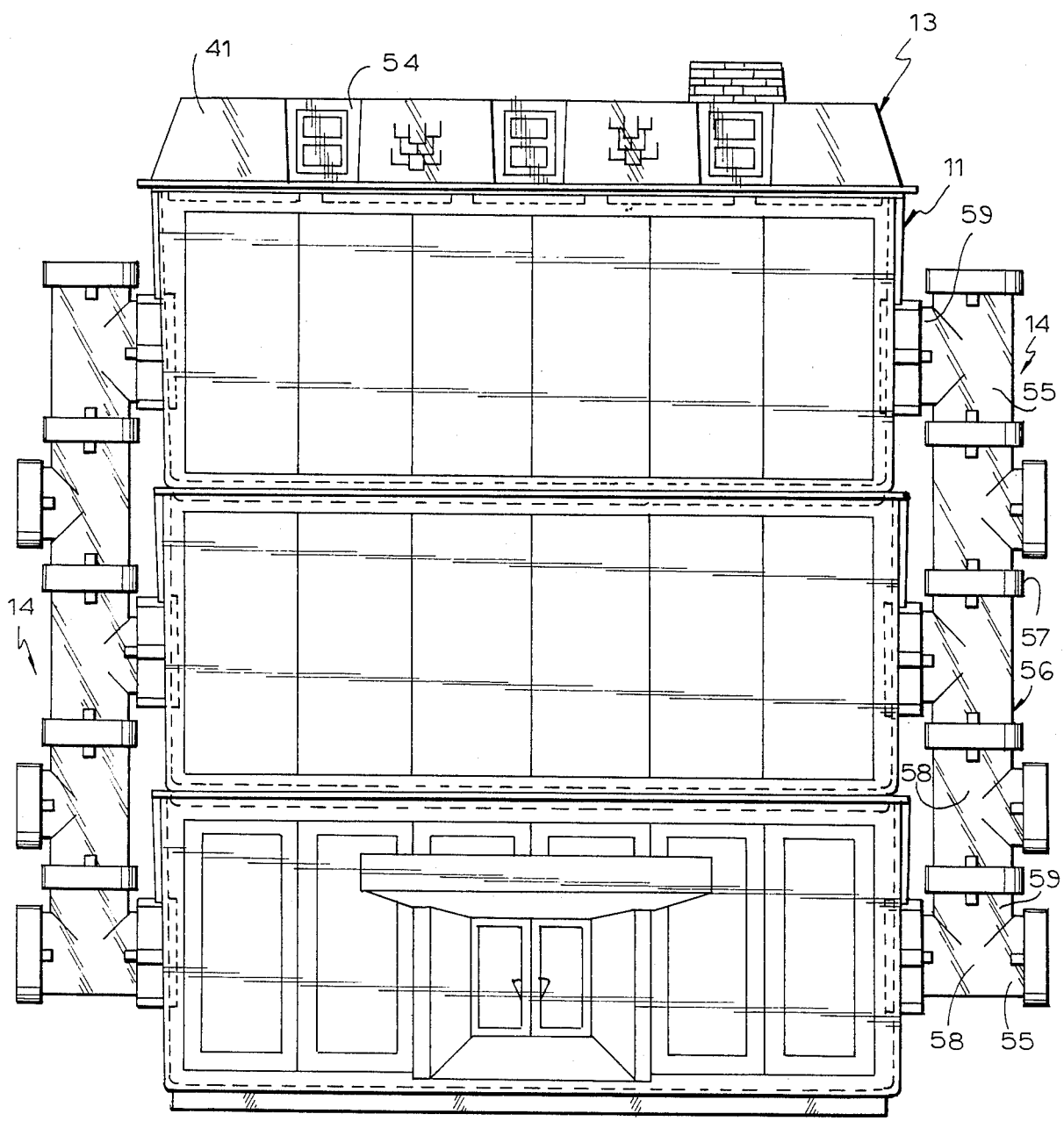
FIG. 1 is front elevational view of an assembled animal habitat in accordance with the present invention.
Figure 2:
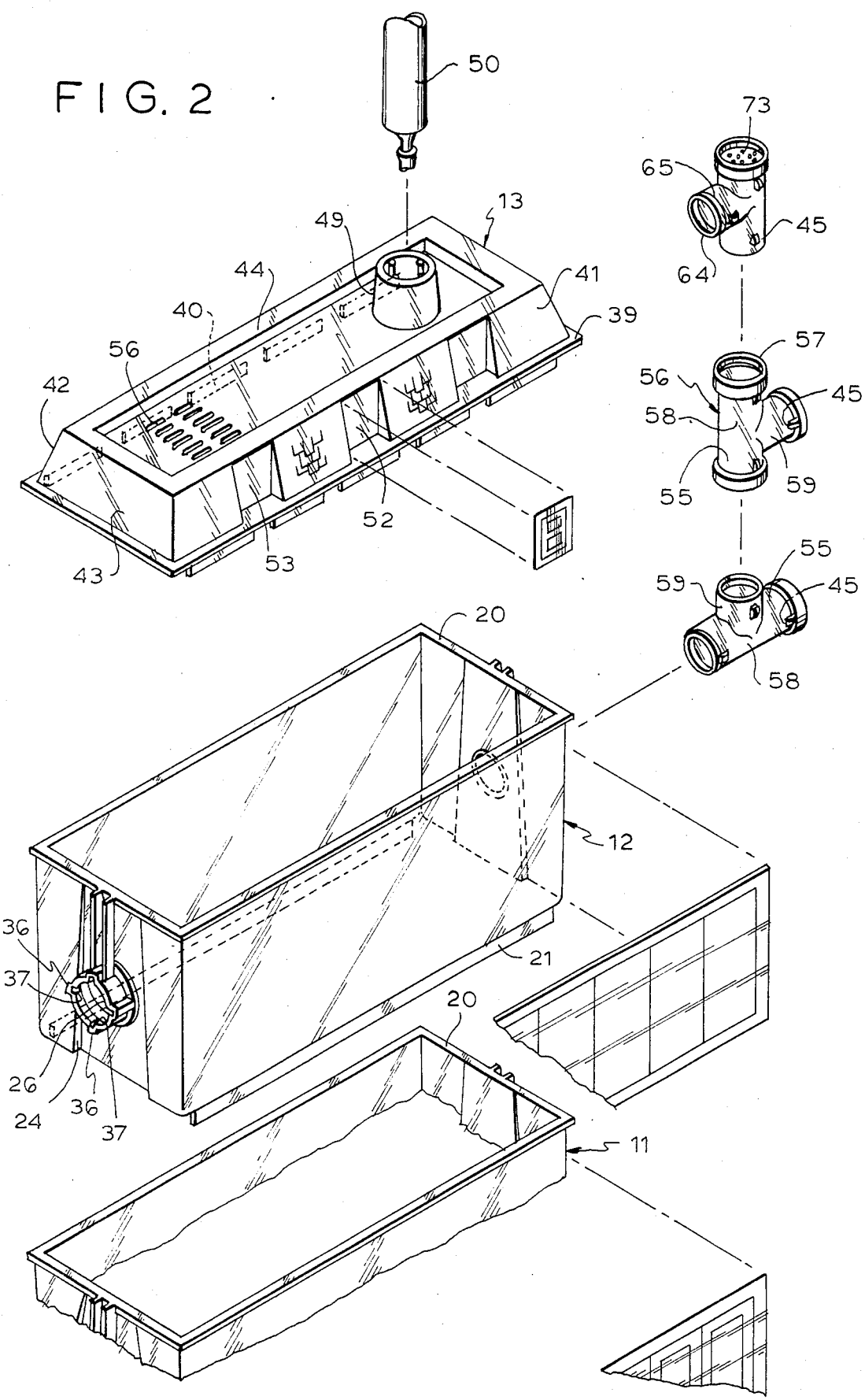
FIG. 2 is an exploded perspective view of a part thereof.
Figure 5:
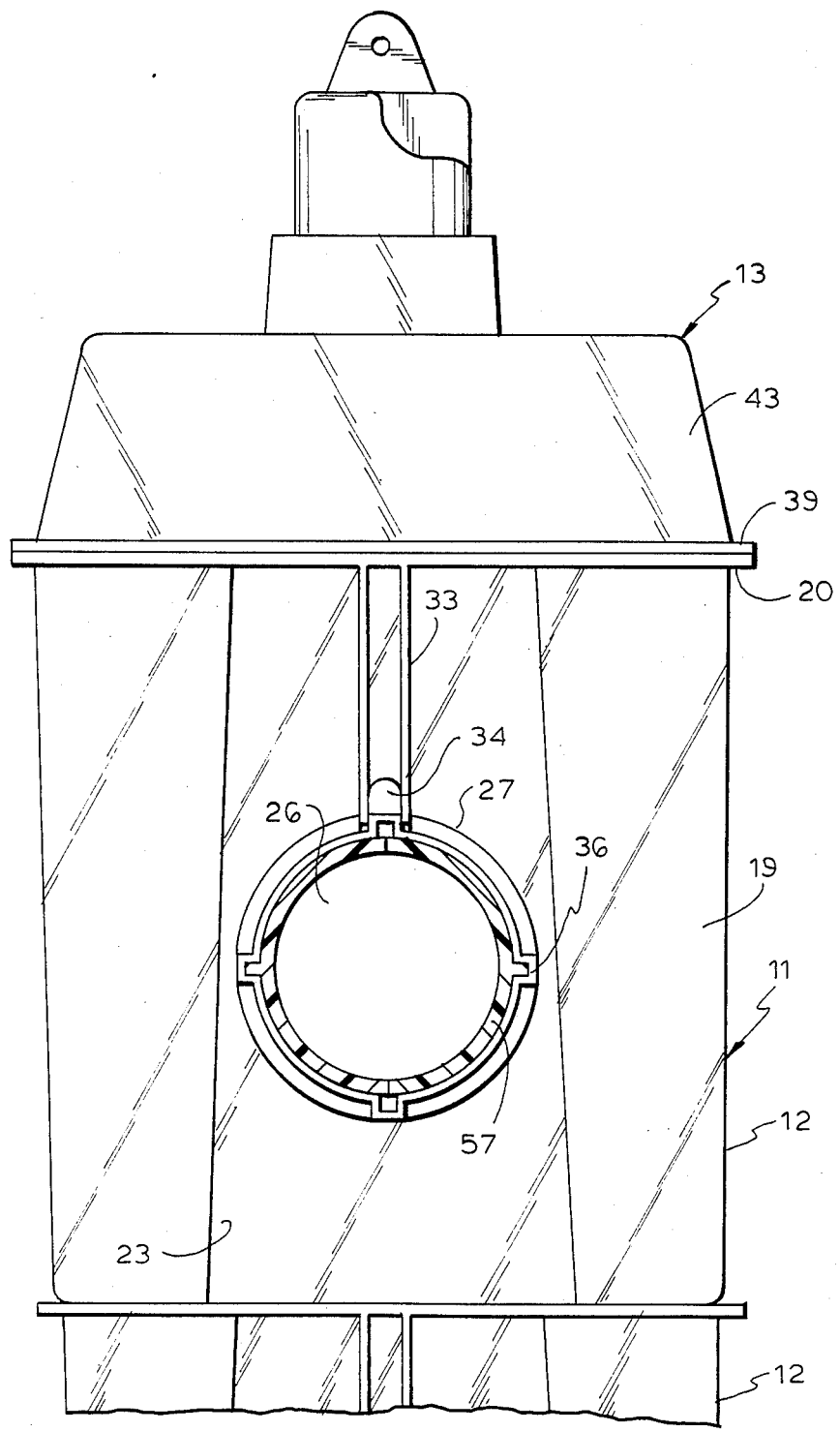
FIG. 5 is a sectional view taken along line 5—5 in FIG. 3.

Referring now to the drawings which illustrate a preferred embodiment of the present invention the reference numeral 10 generally designates the improved animal habitat which may be employed as such or coupled to one or more other animal habitats offset from animal habitat 10 as will be hereinafter described.

Habitat 10 includes a multicompartment housing section 11 formed of a plurality of vertically stacked similarly shaped housing modules or units 12 and a top cover or roof member 13 and a conduit network 14 interconnecting the housing units 12 and offering intercommunication between the interior thereof and locking units 12 in stacked condition.

Each housing unit 12 is integrally formed by injection molding of a thermoplastic resin composition, for example, polystyrene or the like and the walls thereof are transparent and preferably clear and colorless. Housing unit 12 includes a horizontal rectangular bottom wall 16, and approximately rectangular front and rear walls 17 and 18 respectively and side or end walls 19, walls 17, 18 and 19 diverging slightly outwardly upwardly and projecting upwardly from corresponding edges of bottom wall 16 and terminating at their tops in horizontal coplanar edges. An outwardly directed planar peripheral flange 20 is formed along the top edges of walls 17, 18, and 19 and depending from bottom wall 16 shortly inwardly from the outer edges thereof are positioning lips 21 which delineate with the outer edges of bottom wall 16 front and rear peripheral bottom shoulders 22. Each end wall 19 is medially inwardly laterally recessed along its full height to provide an inwardly offset vertical wall section 23 delineated from the outer portion of end wall 19 by vertically extending shoulders 24. Centrally formed in each recessed wall section 23 is a circular port or opening 26. A resilient coupling collar 27 formed, for example, of polyethylene, coaxially registers with each port 26 and has an annular end face abutting the front border of port 26 an projects outwardly. A preferably metal locking ring 28 tightly engages each port 26 and the inner inside peripheral face of a respective collar 27 and has a peripheral flange 29 abutting the inside face of the border of port 26, the border of port 26 being embraced by flange 29 and the end face of collar 27 to secure collar 27 to respective offset wall 23. Formed on the inside face of collar 27 and abutting the outer end face of collar 29 is a peripheral rib 30 having a peripheral groove 32 formed therein. A pair of transversely spaced parallel vertical ribs 33 is medial formed on the outside face of each offset wall 23 and extends from the upper edge thereof to the border of respective port 26, the respective collar 27 having a radially outwardly projecting orienting tab 34 entrapped between adjacent ribs 33. Formed on the outside peripheral face of collar 27 are four longitudinal ribs 36 arranged in quadrature with the top rib 36 in vertical registry with tab 34 and a longitudinal positioning recess or groove 37 is formed in the outer end of each rib 36 and extends to the outer end thereof.

The roof member 13 includes a rectangular bottom peripheral flange 39 of the shape and approximate dimensions of the top peripheral flange 20 of a housing unit 12, a plurality of longitudinally spaced vertical lips 40 depending from the inside edges of the long sides of flange 39. Extending upwardly from the inside edges of flange 39 are inwardly upwardly inclined trapezoidal front, rear and end walls 41, 42 and 43 respectively, the upper edges of which are integrally formed with corresponding peripheral edges of a horizontal rectangular top wall 44. A rectangular well 46 is formed in top wall 44 extending for a major part thereof and including a horizontal bottom wall 47 and a vertical peripheral wall 48. A chimney simulating sleeve 49 permitting the insertion and releasable retention of a cylindrical water bottle 50 is formed on and projects upwardly from well bottom wall 47 longitudinally offset from the center thereof. Sleeve 49 is open at its ends providing access to the upper housing unit 12 and has a plurality of peripherally spaced longitudinal ribs 51 formed on its inside face. Formed in the roof member front wall 41 are a plurality of longitudinally spaced recesses 52 having vertical rectangular inner walls 53 on which window simulating decalcomania 54 are applied and facia simulating decalcomania are applied to front wall 41. Advantageously, simulated shingles are molded into roof 13. Vent apertures 56 are formed in the well bottom wall 47.

Each conduit network 14 comprises an assembly of similar tubular tees 56 and coupling rings 57, each tubular tee 56 including a pair of coaxial first legs 55 defining a cross arm 58 and a medial second leg 59 perpendicular to and one half the length of cross arm 58. Each tee 56 is formed of a transparent thermoplastic resin and is bisected along a medial longitudinal plane into two complementary mating halves 60 with mating stepped confronting edges 61. The outer peripheral edges of the free ends of tee arms and legs 58 and 59 are beveled as at 64 and formed in the outer faces of the tee arms and legs 58 and 59 directly inwardly of the free ends thereof are peripheral coupling grooves 65 which are delineated by annular peripheral shoulders. Shallow ridges of rectangular cross section are peripherally formed on the outer borders of the inside faces of tee arms 58 and legs 59 in radial registry with respective grooves 65. Formed on the inside faces of tee arms 58 remote from respective legs 59 are two or more longitudinally spaced semicircular peripheral ribs 67. Located on each of the outside faces of each tee leg 55, 59 immediately rearwardly of respective groove 37 is a pair of diametrically opposite positioning lugs or projections 45 lying along an axis perpendicular to the longitudinal medial plane of the tee 56.

In the illustrated embodiment, the conduit network 14 interconnecting three housing units 12 includes five tubular tees 56 with the arms 58 of the upper tees being coaxial with the leg 59 of the lowermost tee and substantially end to end, the proximate ends of successive arms 58 and lowermost tee leg 59 being connected by a coupling ring 57 formed of rubber or polyethylene or other elastomeric or resilient material. Each ring 57 has a pair of longitudinally spaced peripheral grooves 69 formed in its inside face and separated by a peripheral intermediate ridge 70 and bordered by outer ribs 71, the end faces of the rings being inwardly tapered. In the assembled condition of the conduit network 14, the ribs 71 of each coupling ring engage the grooves 65 in the proximate ends of tee cross arms 58 to interconnect the successive tees and to releasably retain the complementary halves of respective tees in assembled condition. The coupling ring ridges 70 ar embraced by the confronting end faces of successive tees 56.

The lowermost conduit tee 56 is oriented with its leg 59 coaxial with the cross arms 58 of the upper tees, the proximate ends of the lowermost tee medial leg 59 and the next successive tee cross arm 58 being releasably connected by coupling ring 57 as earlier explained. In the assembled condition of the habitat 10 the cross arm 58 of the lowermost tee 56 is horizontal with a leg 55 thereof coupled to the collar 27 on the bottom housing unit 12, the respective front beveled peripheral lip 65 thereof releasably engaging a mating groove 32 and the respective positioning lugs 45 engaging a pair of horizontally spaced recesses 37. The legs 59 of alternate tees 56 above the lowermost tee are releasably coupled to respective collars 27 as explained above with the tees 56 between the housing unit coupled tees being oriented with their legs 59 projecting outwardly in any desired direction.

If desired, one or more additional habitats may be provided, each including a multicompartment housing section and conduit network of the nature of the housing section 11 and network 14 described earlier and these may be horizontally offset from habitat 10 and from each other in any desired direction and for any desired distance. The conduit networks of the various habitats may intercommunicate by coupling one or more of the respective tee legs by additional tees or the assemblies or by elongated conduits constructed in the manner of tee cross arms 58, the connections being separably achieved by means of coupling rings 57. Additionally, one or more of the walls of the housing units 12 may be decorated preferably by the application thereto of the desired representations by means of decalcomania 54 selected from a group of decalcomania containing different representations, at least some of the wall area, preferably most, being left transparent.

Those tee legs 55 and 59 which are free and uncoupled are each closed by a perforate blocking disc 73 which is connected to the open end of a respective tee leg 55, 59 by means of a coupling ring 57 one of whose internal peripheral groove 69 engages the peripheral end lip of the respective tee leg and the other peripheral groove 69 engaging the border of the blocking disc.

The disassembly of the habitat 10 to facilitate its cleaning and for other purposes and its reassembly may be easily and rapidly accomplished. The conduit network is detached from the housing section by retracting it from the housing section so as to uncouple the coupled tee legs from the respective coupling ring 57, the coupling rings 57 are detached from the ends of the respective tee legs 55 and 59 and each of the tees 56 is separated into its component halves to provide full access to their interiors for cleaning purposes. The water bottle B of known construction which is releasably retained by the roof collar 49 with its bottom feed end located in the uppermost housing unit 12 is removed and the housing units 12 and roof 13 vertically separated. After the various units have been cleaned and otherwise treated they are reassembled in an opposite manner, the roof 13 and housing units 12 are stacked in mating fashion, the coupling rings 57 are reapplied to the respective reconnected halves of the tee legs from which they have been removed and the blocking discs 73 inserted into engagement therewith and the reassembled conduit network 14 is then coupled to the stacked housing units 12 by inserting the appropriate tee legs 55, 58 into mating engagement with respective coupling collars 27. The conduit network not only affords animal passage communication between the habitat compartments but also releasably locks the housing units 12 in their vertically stacked position.

While there has been described and illustrated a preferred embodiment of the present invention, it is apparent that numerous alterations, omissions and additions may be made without department from the spirit thereof.

I claim:

1. An animal habitat comprising a vertical stack of compartment defining modules, each module being open at its top and being integrally formed and being at least partially transparent and including a rectangular bottom wall and front, rear and end walls extending upwardly from corresponding borders of said bottom wall and at least one of said end walls of each unit having a port formed therein, an animal passageway defining conduit providing communication between said compartment modules and including a plurality of first tubular tees, each of said first tubular tees including a vertical cross arm and an intermediate horizontal leg registering with a respective port and a second tubular tee similar to said first tubular tees, the cross arms of said first and second tubular tees being coaxial and the cross arm of said second tubular tee being disposed between successive first tubular tee cross arms and connector means interconnecting successive cross arms of said first and second tubular tees, and coupling means interlocking the ends of said first tubular tee horizontally extending legs with the borders of respective ports.

2. The animal habitat of claim 1, said coupling means including a coupling collar coaxially anchored in each of said ports, respective legs of said first tubular tees being coupled to said collars.

3. The animal habitat of claim 1 wherein each of said tee cross arms has a peripheral groove formed in the outer face thereof and said connector means comprises an elastic ring having axially spaced peripheral ribs fromed on its inside face and engaging the grooves of the adjacent ends of successive tee cross arms.

4. The animal habitat of claim 1 wherein each of said modules has integrally formed therewith along the front and rear borders of the bottom wall thereof depending positioning members which engage the upper borders of the inside faces of the front and rear walls of the next successive lower module.

5. The animal habitat of claim 1 wherein the front rear and end walls of each of said modules terminate in coplanar outwardly directed flanges, an upper module resting on said flanges of the next successive lower module.

6. The animal habitat of claim 5 comprising an integrally formed roof unit resting on the topmost compartment module and including a rectangular top wall and front, rear and end walls depending from corresponding edges of said top wall and terminating in outwardly directed coplanar flanges resting on said top most compartment module flanges.

7. The animal habitat of claim 6 including positioning members depending from inner borders of said roof unit wall flanges and engaging the inside faces of corresponding walls of said topmost module unit.

8. The animal habitat of claim 1 wherein each of said tubular tees comprises mating complementary halves delineated from each other along a medial longitudinal plane and means releasably locking said halves in assembled condition.

9. The animal habitat of claim 8 wherein said tee halves locking means includes rings separably engaging the ends of the cross arm of the respective tee.

10. The animal habitat of claim 1 including blocking plates engaging the free outer ends of said tubular tees which are in an uncoupled condition.

11. The animal habitat of claim 1 including means for coupling an intermediate arm of at least one of said second tubular tees to a horizontally offset compartment module.

12. The animal habitat of claim 1 including decalcomania applied representations carried by selected of said module walls.

* * * * *